(12) United States Patent
Yoo et al.

(10) Patent No.: US 9,810,787 B2
(45) Date of Patent: Nov. 7, 2017

(54) APPARATUS AND METHOD FOR RECOGNIZING OBSTACLE USING LASER SCANNER

(71) Applicants: Hyundai Motor Company, Seoul (KR); Kia Motors Corporation, Seoul (KR); Industry-Academic Cooperation Foundation, Yonsei University, Seoul (KR)

(72) Inventors: Minkyun Yoo, Seoul (KR); Hyunju Kim, Gyeonggi-do (KR); Hoon Lee, Gyeonggi-do (KR); Youngwon Kim, Gyeonggi-do (KR); Hyungsun Jang, Gyeonggi-do (KR); Baehoon Choi, Seoul (KR); Beomseong Kim, Seoul (KR); Euntai Kim, Seoul (KR)

(73) Assignees: Hyundai Motor Company, Seoul (KR); Kia Motors Corporation, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 510 days.

(21) Appl. No.: 14/142,469

(22) Filed: Dec. 27, 2013

(65) Prior Publication Data
US 2015/0070682 A1 Mar. 12, 2015

(30) Foreign Application Priority Data
Sep. 10, 2013 (KR) .................. 10-2013-0108446

(51) Int. Cl.
*G01C 3/08* (2006.01)
*G01S 17/93* (2006.01)
(Continued)

(52) U.S. Cl.
CPC .......... *G01S 17/936* (2013.01); *G01S 17/023* (2013.01); *G01S 17/42* (2013.01)

(58) Field of Classification Search
CPC ....... B60Q 9/008; G01S 17/936; G01B 11/14; G01B 11/24
(Continued)

(56) References Cited

U.S. PATENT DOCUMENTS

| | | | |
|---|---|---|---|
| 8,633,832 B2* | 1/2014 | Koike | B60Q 5/00 340/435 |
| 2010/0191391 A1* | 7/2010 | Zeng | G01S 13/723 701/1 |

(Continued)

FOREIGN PATENT DOCUMENTS

| KR | 10-2012-0034352 A | 4/2012 |
|---|---|---|
| KR | 10-2012-0037065 A | 4/2012 |
| KR | 10-1305695 B1 | 9/2013 |

*Primary Examiner* — Mark Hellner
(74) *Attorney, Agent, or Firm* — Mintz Levin Cohn Ferris Glovsky and Popeo, P.C.; Peter F. Corless (57) ABSTRACT

An apparatus and method for recognizing an obstacle using a laser scanner are provided. The apparatus includes a laser scanner that is installed at the front of a traveling vehicle and is configured to acquire laser scanner data configured of multiple layers in real time and an imaging device installed at the front of the moving object and is configured to acquire video data. A controller is configured to divide first laser scanner data item and second laser scanner data item acquired by the laser scanner into multiple layers to extract measurement data items each existing in the respective layers and is configured to compare the measurement data items in the same layer of the multiple layers to determine whether an obstacle is present ahead of the traveling vehicle. Additionally, the controller is configured to combine the laser scanner data reflecting whether an obstacle is present with the video data.

12 Claims, 4 Drawing Sheets

(51) Int. Cl.
*G01S 17/02* (2006.01)
*G01S 17/42* (2006.01)

(58) Field of Classification Search
USPC ........................................................ 356/4.01
See application file for complete search history.

(56) References Cited

U.S. PATENT DOCUMENTS

| | | | | |
|---|---|---|---|---|
| 2011/0248880 | A1* | 10/2011 | Miyahara | G01S 7/4802 342/54 |
| 2012/0001769 | A1* | 1/2012 | Nitanda | G01S 17/42 340/901 |
| 2015/0332102 | A1* | 11/2015 | Lu | G01S 7/4802 348/222.1 |

* cited by examiner

APPARATUS AND METHOD FOR RECOGNIZING OBSTACLE USING LASER SCANNER

CROSS-REFERENCE TO RELATED APPLICATION

This application is based on and claims priority from Korean Patent Application No. 10-2013-0108446, filed on Sep. 10, 2013 in the Korean Intellectual Property Office, the disclosure of which is incorporated herein in its entirety by reference.

BACKGROUND

Field of the Invention

The present invention relates to an apparatus and method for recognizing an obstacle using a laser scanner, and more particularly, to an apparatus and method for recognizing an obstacle using a laser scanner in which multiple layers of laser scanner data acquired by a multilayer laser scanner are separated and data existing in each of the layers are used to determine whether there is an obstacle ahead of a vehicle.

Description of the Prior Art

As navigation devices which are installed in vehicles to provide services such as guiding directions and notifying obstacles become more common, an algorithm for recognizing obstacles such as other vehicles and pedestrians are continuously being developed. Vehicles are equipped with sensors such as a radar sensor, a laser scanner, an image sensor, an ultrasonic sensor used to recognize such obstacles. Since each of the sensors has pros and cons, the sensor fusion technology is also being developed in which two or more sensors are used to make up for the shortcomings.

The laser scanner, inter alia, provides more accurate distance information and angle information than other sensors. However, it may be difficult to separate the laser scanner data items acquired by the laser scanner based on different obstacles. Further, since the laser scanner data includes angle information and distance information only, it may be difficult to classify obstacles such as vehicles and pedestrians based on the laser scanner data. In addition, the laser scanner acquires two-dimensional laser scanner data only from the height at which it is installed, and thus noise may occur in the laser scanner data even when no obstacle is present since the ground may be recognized as an obstacle. Moreover, since the laser scanner uses light, noise may exist in the laser scanner data even when no obstacle is present depending on ambient brightness, thus causing obstacle recognition errors.

SUMMARY

Accordingly, the present invention provides an apparatus and method in which multiple layers having laser scanner data items acquired by a laser scanner are separated to separate measurement data items each existing in the respective layers based on different obstacles.

In addition, the present invention provides an apparatus and method in which multiple layers configuring laser scanner data items acquired by a laser scanner are separated to determine measurement data items each existing in the respective layers, to determine whether there is an obstacle, and to determine the location, size, and type of the obstacle.

In one aspect of the present invention, an apparatus for recognizing an obstacle using a laser scanner may include: a laser scanner installed at the front of a moving object (e.g., a traveling vehicle) and configured to acquire laser scanner data configured as multiple layers in real time; an imaging device installed at the front of the moving object and configured to acquire video data; a controller configured to divide first laser scanner data item and second laser scanner data item acquired by the laser scanner into multiple layers to extract measurement data items each existing in the respective layers, and configured to compare the measurement data items in the same layer of the multiple layers to determine when there is an obstacle ahead of the moving object; and an output unit executed by the controller and configured to combine the laser scanner data with the video data based on whether there is an obstacle.

The controller may be configured to compare the measurement data items in the same layer and determine that there is no obstacle ahead of the moving object when the measurement data items meet a predetermined condition. The controller may be configured to recognize that the measurement data items are not an obstacle when the measure data items are consecutively observed in the same layer of the first laser scanner data item and the second laser scanner data item and the measurement data items exist within a threshold radius with respect to the moving object. Additionally, the controller may be configured to remove the measurement data items from the first laser scanner data item and the second laser scanner data item when it is determined that the measurement data items are not an obstacle. The controller may be configured to determine obstacle information including a location, a size and a type of the obstacle when it is determined that the measurement data is recognized as an obstacle. The controller may be configured to combine the video data with the determined obstacle information to output the combined video data.

In another aspect of the present invention, a method for recognizing an obstacle using a laser scanner may include: receiving, at a controller, laser scanner data configured as multiple layers from a laser scanner installed in the front of a moving object in real time, dividing, by the controller, a first laser scanner data item provided from the laser scanner into multiple layers to extract measurement data items from the respective layers; dividing, by the controller, a second laser scanner data item provided from the laser scanner into multiple layers to extract measurement data items from the respective layers; comparing, by the controller, the measurement data items in the same layer of the multiple layers of the first and second laser scanner data items; determining, by the controller, whether there is an obstacle ahead of the moving object based on the comparison result; and combining, by the controller, the laser scanner data reflecting whether there is an obstacle with video data acquired by a imaging device, to output the combined image.

The determination may include determining that there is no obstacle ahead of the moving object when the measurement data items meet a predetermined condition as a result of the comparing of the measurement data items. Further, the comparing of the measurement data items may include: comparing the measurement data items in the same layer of the first laser scanner data item and the second laser scanner data item to determine whether the measurement data items are consecutively observed; and comparing the measurement data items in the same layer of the first laser scanner data item and the second laser scanner data item to determine whether the measurement data items exist within a threshold radius with respect to the moving object.

The method may further include, after the determination process, removing the measurement data items when they are not recognized as an object. In addition, after the determination process, the method may include determining obstacle information including a location of an obstacle, a size of the obstacle, and a type of the obstacle when the measurement data items are recognized as an obstacle. The combining may include outputting the video data when there is no obstacle; and combining the video data with the determined obstacle information to output the combined video data when there is an obstacle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, exemplary embodiments of the present invention will be described in more detail with reference to the accompanying drawings. In describing embodiments, features that are well known in the art and are not directly related to the present invention will not be described wherever possible. This is not to obscure the gist of the present invention.

Figure 1:
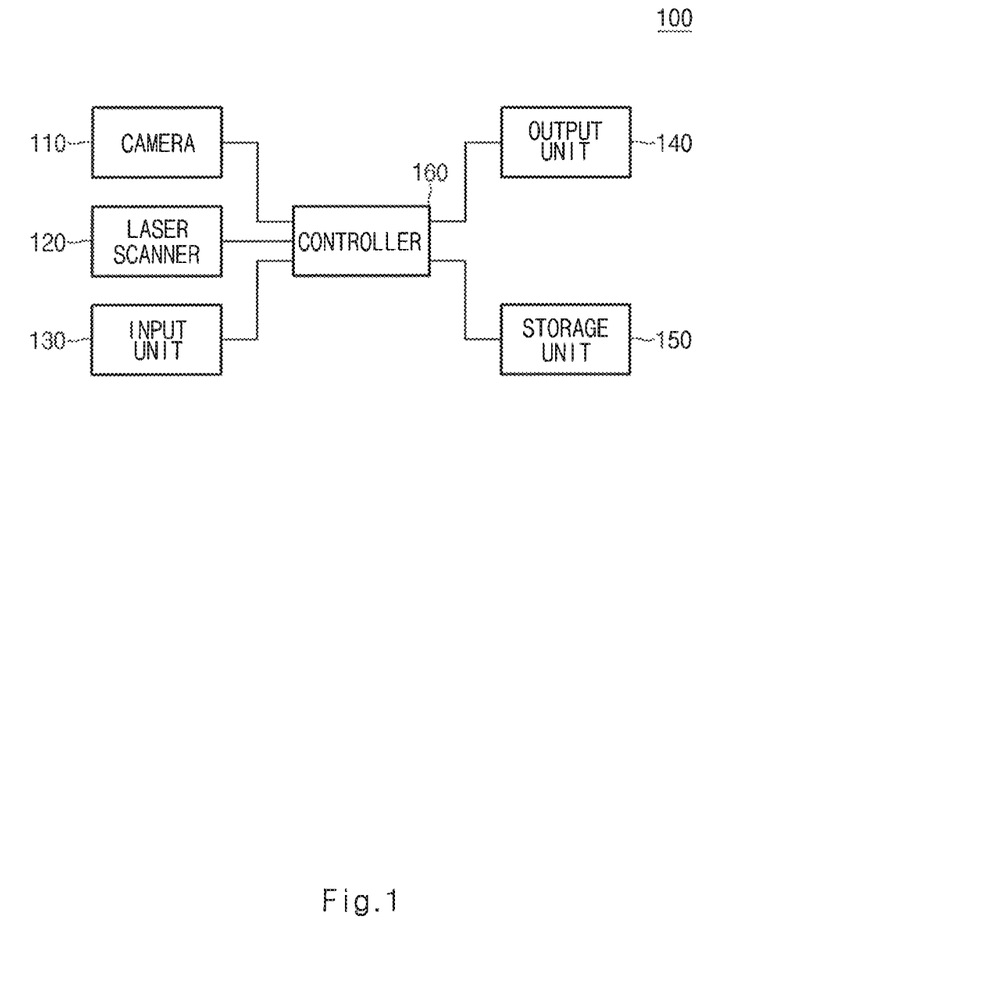
FIG. 1 is an exemplary block diagram showing major elements of an apparatus for recognizing an obstacle using a laser scanner according to an exemplary embodiment of the present invention.

FIG. 1 is an exemplary block diagram showing major elements of an apparatus for recognizing an obstacle using a laser scanner according to an exemplary embodiment of the present invention. FIGS. 2A-2C and 3A-3C are exemplary views showing results of recognizing an obstacle using a laser scanner according to an exemplary embodiment of the present invention. Referring to FIGS. 1 to 3C, an apparatus for recognizing an obstacle using a laser scanner (referred hereinafter to as "the apparatus 100") according to an exemplary embodiment of the present invention may include an imaging device 110, a laser scanner 120, an input unit 130, an output unit 140, a storage unit 150 and a controller 160. The controller 160 may be configured to execute the imaging device 110, the laser scanner 120, the input unit 130, the output unit 140, and the storage unit 150.

The imaging device 110 may be installed at the front of a vehicle and may be configured to acquire image data ahead of the vehicle at a current location to provide the data to the controller 160. The laser scanner 120 may be installed within the vehicle and may be configured to acquire laser scanner data ahead of the vehicle to provide the data to the controller 160. The laser scanner data may be configured as multiple layers, and, accordingly, the laser scanner 120 may preferably be a multilayer laser scanner. The laser scanner 120 may use, but is not limited to, a light detecting and ranging (LiDAR) laser radar, and various comparable sensors and laser scanners may also be used.

The input unit 130 may be configured to receive numeral or text information and may be configured to transmit a key signal that relates to setting various functions and operating functions of the apparatus 100. The input unit 130 may be a touch pad or a key pad having typical key arrangement based on the type of the apparatus 100. The input unit 130 may include a touch screen and the input unit 130 may be displayed on the output unit 140. In the exemplary embodiment of the present invention, for the sake of improving user convenience, the input unit 130 may be configured as a touch pad or touch screen.

Figure 2A:
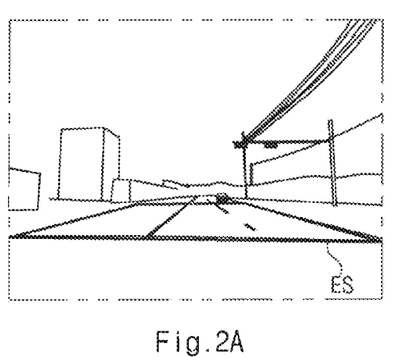
FIGS. 2A-2C and 3A-3C are exemplary views showing results of recognizing an obstacle using a laser scanner according to an exemplary embodiment of the present invention.
Figure 3A:
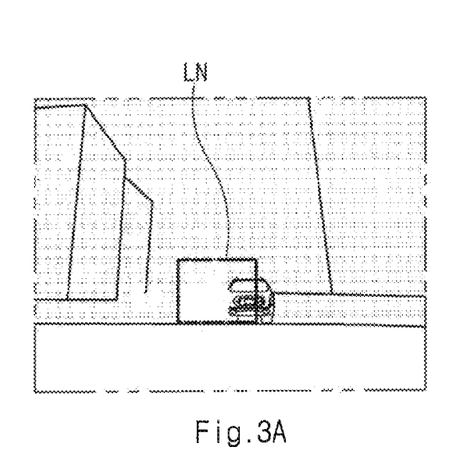

The output unit 140 may be configured to display screen data such as various types of menu data and digital broadcast screen data which arise in executing a program under the control of the controller 160, and may be configured to display outside video data ahead of the vehicle as shown in FIGS. 2A and 3A. In particular, "ES" shown in FIG. 2A and "LN" shown in FIG. 3A may not be displayed on the output unit 140. Further, the storage unit 150 may be configured to store application programs (e.g., a program for separating multiple layers configuring laser scanner data from one another, a program for determining an obstacle included in the laser scanner data) necessary for executing functions according to the exemplary embodiment of the present invention.

Figure 2B:
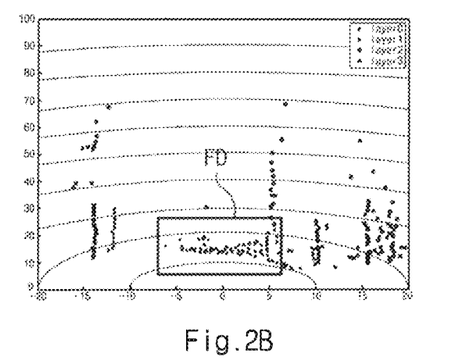
Figure 2C:
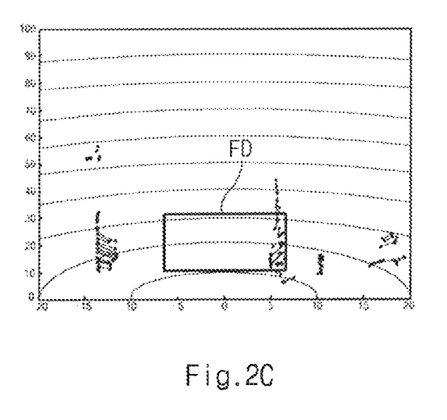
Figure 3B:
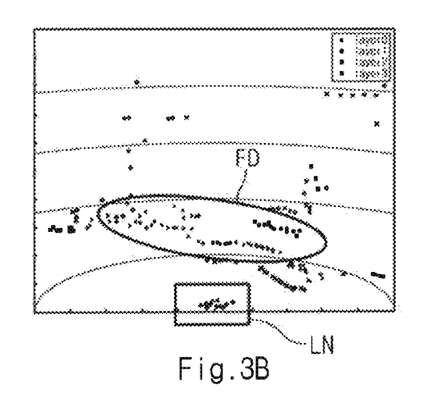

The controller 160 may be configured to separate multiple layers configuring first laser scanner data item acquired by the laser scanner from one another to extract a measurement data item A_data from each of the layers, separate multiple layers configuring second laser scanner data item from one another to extract a measurement data item B_data from each of the layers, and compare A_data with B_data to determine whether an obstacle is present ahead of a vehicle. Specifically, referring to FIGS. 2A-2C and 3A-3C, FIG. 2A shows video data acquired by an imaging device 110, in which the reference symbol ES represents an empty road ahead of a vehicle. FIG. 3A shows video data acquired by the imaging device 110, in which the reference symbol LN represents a head light from a vehicle traveling in an opposite direction. FIGS. 2B and 3B show laser scanner data acquired by the laser scanner 120. Additionally, it may be seen that the laser scanner data is configured of 0th layer (layer 0) to $3^{rd}$ layer (layer 3), and that different measurement data items may be included in the layers configuring the laser scanner data.

Furthermore, the reference symbol "FD" in FIG. 2B represents the measurement data that corresponds to the reference symbol "ES" in FIG. 2A, detected in layer 0 of the laser scanner data. The reference symbol FD in FIG. 3B may be substantially identical to the reference symbol FD in FIG. 2A, and the reference symbol LN in FIG. 3B represents the measurement data that corresponds to the reference symbol LN in FIG. 3A. In addition, the reference symbol LN in FIG. 3B may be the measurement data detected in layer 1 of the laser scanner data. It is to be noted that number of the layers is not limited to three but may be changed by those skilled in the art.

Moreover, to avoid recognizing the ground ahead of the vehicle as an obstacle by removing noise from the ground, the controller 160 may be configured to select first laser scanner data and second laser scanner data from the laser scanner data received from the laser scanner 120 in real time as shown in FIG. 2B. The controller 160 may be configured to compare the measurement data A_data determined in each of the layers configuring the first laser scanner data item with the measurement data B_data determined in each of the layers configuring the second laser scanner data item, and may not recognize the measurement data as an obstacle when a predetermined condition is met.

Specifically, when the measurement data included in layer 0 of the first laser scanner data and the second laser scanner data is distributed in a certain region (e.g., the region corresponding to FD in FIG. 2B), the controller 160 may be configured to recognize that the measurement data is consecutively generated in the same layer. Moreover, when the measurement data meets a predetermined condition, namely, the measurement data is distributed and consecutively generated in a region which is about 0 to 40 m ahead of the vehicle, is repeatedly appearing and disappearing, and is generated extending horizontally, the controller 160 may be configured to recognize that A_data and B_data are noise data generated by the ground (indicated by ES in FIG. 2A) ahead of the vehicle. As shown in FIG. 2C, the controller 160 may be configured to remove the measurement data items, each existing in the region that corresponds to FD and recognized as noise data, from the respective laser scanner data items. As described above, A_data and B_data are merely noise data generated by the ground ahead of the vehicle, and thus the controller 160 may not recognize A_data and B_data as an obstacle.

The controller 160 may be configured to combine the laser scanner data items from which the measurement data is removed as shown in FIG. 2C with the video data acquired by the imaging device 110, to output the data to the output unit 140.

To avoid recognizing the head light from a vehicle traveling in the opposite direction as an obstacle by removing noise generated by the head light, the controller 160 may be configured to select first laser scanner data item and second laser scanner data item from the laser scanner data received from the laser scanner 120 in real time as shown in FIG. 3B. The controller 160 may be configured to compare the measurement data A_data determined in each of the layers configuring the first laser scanner data item with the measurement data B_data determined in each of the layers configuring the second laser scanner data item, and may not recognize the measurement data as an obstacle when a predetermined condition is met.

Figure 3C:
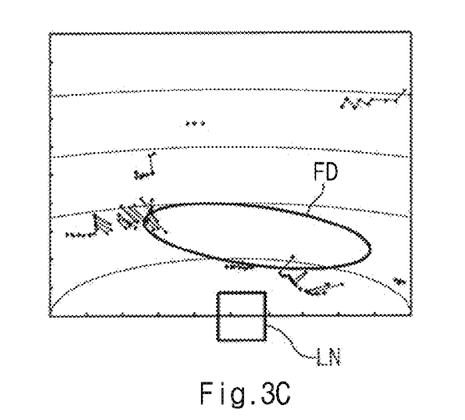

Specifically, when the measurement data included in layer 1 of the first laser scanner data and the second laser scanner data is distributed in a certain region (e.g., the region that corresponds to LN in FIG. 3B), the controller 160 may be configured to recognize that the measurement data is consecutively generated in the same layer. When the measurement data meets a predetermined condition, namely, the measurement data is distributed and consecutively generated in a region which is about 0 to 10 m ahead of the vehicle, has an irregular shape, and is observed as an obstacle farther from A_data and B_data, the controller 160 may be configured to recognize that A_data and B_data are noise data generated by the head light from the vehicle traveling in the opposite direction (indicated by LN in FIG. 3A). As shown in FIG. 3C, the controller 160 may be configured to remove the measurement data, which exists in the region that corresponds to LN and recognized as noise data, from each of the laser scanner data items. As described above, A_data and B_data may be noise data generated by the head light from the vehicle traveling in the opposite direction, and thus the controller 160 may not recognize A_data and B_data as an obstacle. In particular, the description on FD shown in FIGS. 3B and 3C may be omitted since it is given previously with reference to FIGS. 2B and 2C. The controller 160 may be configured to combine the laser scanner data items from which the measurement data is removed as shown in FIG. 3C with the video data acquired by the imaging device 110, to output the data to the output unit 140.

Furthermore, when the measurement data does not meet the predetermined condition to remove noise data generated from the ground ahead of the vehicle or from the head light of the vehicle traveling in the opposite direction, the controller 160 may be configured to recognize the measurement data as on obstacle. The controller 160 may be configured to combine the measurement data recognized as an obstacle with the video data acquired by the imaging device 110, to output the data to the output unit 140. In particular, the controller 160 may be configured to determine obstacle information including the accurate location, size and type of the measurement data.

Figure 4:
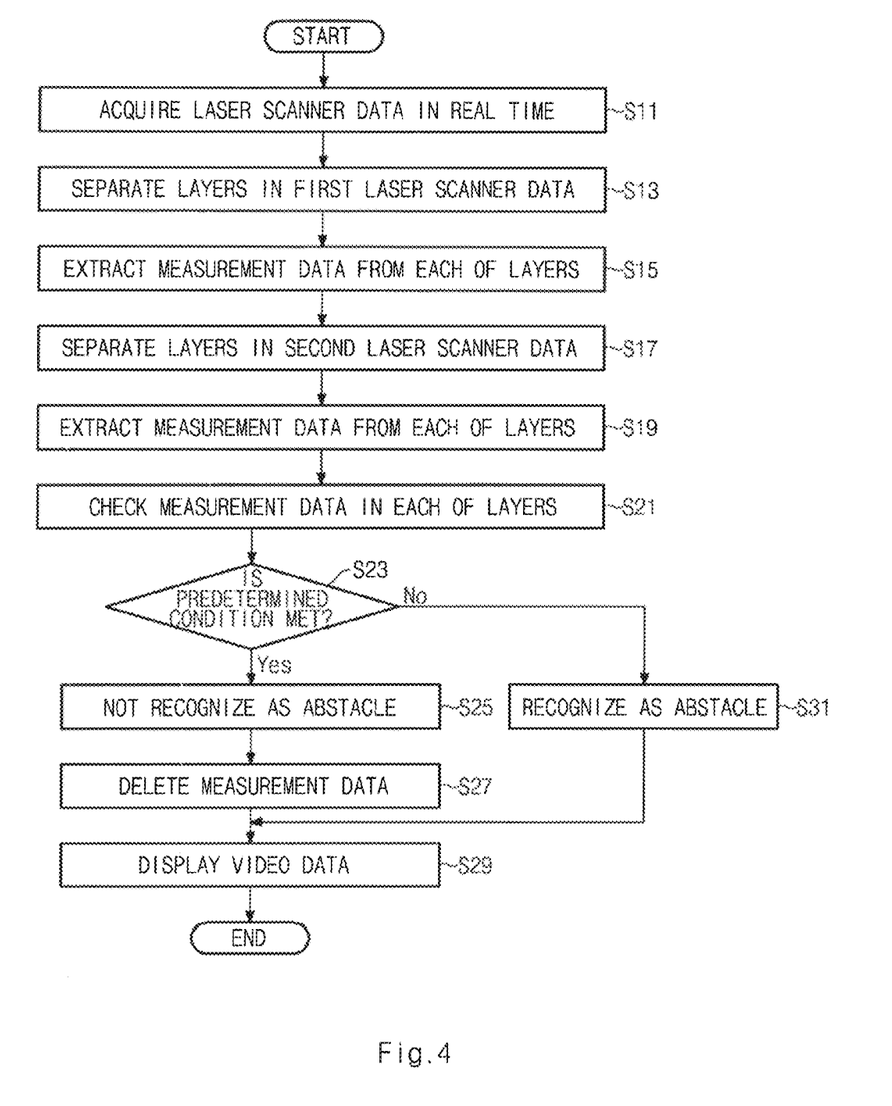
FIG. 4 is an exemplary flowchart illustrating a method for recognizing an obstacle using a laser scanner according to an exemplary embodiment of the present invention.

FIG. 4 is an exemplary flowchart illustrating a method for recognizing an obstacle using a laser scanner according to an exemplary embodiment of the present invention. Referring to FIG. 4, the controller 160 may be configured to receive laser scanner data acquired by the laser scanner 120 in real time in S11. In particular, the laser scanner data may be configured of multiple layers.

Further, in S13, the controller 160 may be configured to select first laser scanner data from the laser scanner data received in real time to divide the first laser scanner data into multiple layers. In S15, the controller 160 may be configured to extract measurement data (A_data) from the divided multiple layers. Then, in S17, the controller 160 may be configured to select second laser scanner data received after first laser scanner data from the laser scanner data received in real time, to divide the second laser scanner data into multiple layers. In S19, the controller 160 may be configured to extract measurement data (B_data) from each of the divided multiple layers.

In S21, the controller 160 may be configured to compare and determine information of the measurement data items each in the respective layers. In other words, the controller 160 may be configured to analyze and compare the measurement data and, in S23, the controller 160 may be configured to determine whether the measurement data meets a predetermined condition. For example, when A_data exists in 0th layer (layer 0) of the first layer data, B_data exists in 0th layer (layer 0) of the second layer data, and the region in which A_data is distributed ahead of a vehicle and the region in which B_data is distributed ahead of the vehicle are substantially similar to each other, the controller 160 may be configured to recognize that A_data and B_data are consecutively generated in the same layer. Moreover, the controller may be configured to determine the shapes of A_data and B_data.

As a determination result of S23, when A_data and B_data meet the predetermined condition, the controller 160 may proceed to S25 and may be configured to not recognize A_data and B_data as an obstacle. For example, when A_data and B_data are distributed in a region which is about 0 to 40 m ahead of the vehicle and consecutively generated, are repeatedly appearing and disappearing, and are generated extending horizontally, the controller 160 may be configured to recognize that A_data and B_data are noise data input as the ground ahead of the vehicle. As described above, A_data and B_data may be noise data input by the ground ahead of the vehicle, and thus the controller 160 may be configured to not recognize A_data and B_data as an obstacle.

Further, when A_data and B_data are distributed and consecutively generated in a region which is about 0 to 10 m ahead of the vehicle and have irregular shapes, and when an obstacle farther than A_data and B_data is observed, the controller 160 may be configured to recognize that A_data and B_data are noise data input by the head light from the vehicle traveling in the opposite direction. As described above, A_data and B_data may be noise data input by the head light from the vehicle traveling in the opposite direction, and thus the controller 160 may be configured to not recognize A_data and B_data as an obstacle.

The controller 160 may then proceed to S27 to remove A_data and B_data which are not recognized as an obstacle from the laser scanner data items, and proceed to S29 to output the video data acquired by the imaging device 110 to output the data to output unit 140. When A_data and B_data do not meet the predetermined condition, the controller may proceed to S31 to recognize A_data and B_data as an obstacle, and the controller 160 may proceed to S29 to combine the measurement data recognized as an obstacle with the video data acquired by the imaging device 110, to output the data to the output unit 140. In addition, the controller 160 may be configured to determine obstacle information including the accurate location, size and type of A_data and B_data.

As set forth above, according to exemplary embodiments of the present invention, multiple layers configuring laser scanner data items acquired by a laser scanner may be separated to allow measurement data items each existing in the respective layers to be separated based on different obstacles, such that it may be easier to determine whether there is an obstacle based on sensed noise data ahead of a vehicle. Further, according to exemplary embodiments of the present invention, multiple layers configuring laser scanner data items acquired by a laser scanner may be separated to determine measurement data items each existing in the respective layers, to more accurately determine whether there is an obstacle, and to more accurately determine the location, size, and type of obstacle.

Thus far, the apparatus and method for recognizing obstacle using a laser scanner according to the exemplary embodiments have been described. Exemplary embodiments have been described in the detailed description and the accompanying drawings. Herein, although specific terms have been used, theses are merely used for the purpose of easily describing the present invention but not used for limiting the scope of the present invention. It is obvious to those skilled in the art that various modifications may be made without departing from the scope of the present invention, other than the exemplary embodiments described herein.

What is claimed is:

1. An apparatus for recognizing an obstacle using a laser scanner, the apparatus comprising:
   a laser scanner installed at the front of a traveling vehicle and configured to acquire laser scanner data configured of multiple plane layers in real time;
   an imaging device installed at the front of the traveling vehicle and configured to acquire video data; and
   a controller configured to:
   divide first laser scanner data item and second laser scanner data item acquired by the laser scanner into multiple plane layers to extract measurement data items each existing in the respective plane layers; and
   compare the measurement data items in the same plane layer of the multiple plane layers to determine whether there is an obstacle ahead of the traveling vehicle;
   combine the laser scanner data with the video data based on whether the obstacle is determined ahead of the traveling vehicle,
   wherein the controller is configured to:
   compare the measurement data items in the same layer; and
   determine no obstacle ahead of the traveling vehicle when the measurement data items meet a predetermined condition,
   wherein a plane of the multiple layers are in parallel with a direction of the laser scanner, and
   wherein the controller is configured to recognize that the measurement data items are not an obstacle when the measurement data items are consecutively observed in the same plane layer of the first laser scanner data item and the second laser scanner data item and the measurement data items exist within a threshold radius with respect to the traveling vehicle.

2. The apparatus according to claim 1, wherein the controller is configured to remove the measurement data items from the first laser scanner data item and the second laser scanner data item in response to determining that the measurement data items are not an obstacle.

3. The apparatus according to claim 1, wherein the controller is configured to determine obstacle information including a location, a size, and a type of the obstacle in response to determining that the measurement data is recognized as an obstacle.

4. The apparatus according to claim 3, wherein the controller is configured to output the video data combined with the determined obstacle information.

5. A method for recognizing an obstacle using a laser scanner, the method comprising:
   receiving, at a controller, laser scanner data configured of multiple plane layers from the laser scanner installed in the front of a traveling vehicle in real time;
   dividing, by the controller, a first laser scanner data item provided from the laser scanner into multiple plane layers to extract measurement data items from the respective plane layers;
   dividing, by the controller, a second laser scanner data item provided from the laser scanner into multiple plane layers to extract measurement data items from the respective plane layers;
   comparing, by the controller, the measurement data items in the same plane layer of the multiple plane layers of the first and second laser scanner data items;
   determining, by the controller, when an obstacle is present ahead of the traveling vehicle based on the comparison result; and
   combining, by the controller, the laser scanner data reflecting whether an obstacle is present with video data acquired by an imaging device, to output the combined image,
   wherein the determination process includes:
      determining, by the controller, no obstacle present ahead of the traveling vehicle when the measurement data items meet a predetermined condition as a result of comparing the measurement data items,
      wherein a plane of the multiple layers are in parallel with a direction of the laser scanner, and
   wherein the comparison of the measurement data items includes:
      comparing, by the controller, the measurement data items in the same plane layer of the first laser scanner data item and the second laser scanner data item to determine whether the measurement data items are consecutively observed; and
      comparing, by the controller, the measurement data items in the same plane layer of the first laser scanner data item and the second laser scanner data item to determine whether the measurement data items exist within a threshold radius with respect to the traveling vehicle.

6. The method according to claim 5, further comprising, in response to determining whether an obstacle is present, removing, by the controller, the measurement data items when the measurements items are not recognized as an object.

7. The method according to claim 6, further comprising, in response to determining whether an obstacle is present, determining, by the controller, obstacle information including a location of an obstacle, a size of the obstacle, and a type of the obstacle when the measurement data items are recognized as an obstacle.

8. The method according to claim 7, wherein the combining process includes:
   outputting, by the controller, the video data when no obstacle is present; and
   combining, by the controller, the video data with the determined obstacle information to output the combined video data when an obstacle is present.

9. A non-transitory computer readable medium containing program instructions executed by a controller, the computer readable medium comprising:
   program instructions that divide a first laser scanner data item provided from the laser scanner into multiple plane layers to extract measurement data items from the respective plane layers;
   program instructions that divide a second laser scanner data item provided from the laser scanner into multiple plane layers to extract measurement data items from the respective plane layers;
   program instructions that compare the measurement data items in the same plane layer of the multiple plane layers of the first and second laser scanner data items;
   program instructions that determine when an obstacle is present ahead of the traveling vehicle based on the comparison result;
   program instructions that combine the laser scanner data reflecting whether an obstacle is present with video data acquired by an imaging device, to output the combined image;
   program instructions that determine no obstacle present ahead of the traveling vehicle when the measurement data items meet a predetermined condition as a result of comparing the measurement data items, wherein a plane of the multiple layers are in parallel with a direction of the laser scanner;
   program instruction that compare the measurement data items in the same plane layer of the first laser scanner data item and the second laser scanner data item to determine whether the measurement data items are consecutively observed; and
   program instruction that compare the measurement data items in the same plane layer of the first laser scanner data item and the second laser scanner data item to determine whether the measurement data items exist within a threshold radius with respect to the traveling vehicle.

10. The non-transitory computer readable medium of claim 9, further comprising:
   program instructions that remove the measurement data items when the measurements items are not recognized as an object, in response to determining whether an obstacle is present.

11. The non-transitory computer readable medium of claim 10, further comprising:
   program instructions that remove obstacle information including a location of an obstacle, a size of the obstacle, and a type of the obstacle when the measurement data items are recognized as an obstacle, in response to determining whether an obstacle is present.

12. The non-transitory computer readable medium of claim 11, further comprising:
   program instructions that output the video data when no obstacle is present; and
   program instructions that combine the video data with the determined obstacle information to output the combined video data when an obstacle is present.

* * * * *